United States Patent
Flemming et al.

(10) Patent No.: US 8,695,011 B2
(45) Date of Patent: *Apr. 8, 2014

(54) MIXED OPERATING PERFORMANCE MODES INCLUDING A SHARED CACHE MODE

(75) Inventors: Diane G. Flemming, Pflugerville, TX (US); William A. Maron, Austin, TX (US); Ram Raghavan, Round Rock, TX (US); Satya Prakash Sharma, Austin, TX (US); Mysore S. Srinivas, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 47 days.

This patent is subject to a terminal disclaimer.

(21) Appl. No.: 13/458,769

(22) Filed: Apr. 27, 2012

(65) Prior Publication Data

US 2012/0216214 A1 Aug. 23, 2012

Related U.S. Application Data

(63) Continuation of application No. 12/650,909, filed on Dec. 31, 2009.

(51) Int. Cl.
*G06F 9/46* (2006.01)
*G06F 1/00* (2006.01)
*G06F 13/00* (2006.01)

(52) U.S. Cl.
USPC ........... 718/104; 718/102; 713/322; 713/320; 711/129; 711/120; 711/118

(58) Field of Classification Search
None
See application file for complete search history.

(56) References Cited

U.S. PATENT DOCUMENTS 6,725,336 B2 * 4/2004 Cherabuddi .................. 711/129
7,035,979 B2   4/2006 Azevedo et al.
(Continued)

OTHER PUBLICATIONS

Wells et al; Mixed-mode multicore reliability, ASPLOS'09 Mar. 7-11, 2009.*

(Continued)

*Primary Examiner* — Jennifer To
*Assistant Examiner* — Bing Zhao
(74) *Attorney, Agent, or Firm* — DeLizio Gilliam, PLLC

(57) ABSTRACT

Functionality is implemented to determine that a plurality of multi-core processing units of a system are configured in accordance with a plurality of operating performance modes. It is determined that a first of the plurality of operating performance modes satisfies a first performance criterion that corresponds to a first workload of a first logical partition of the system. Accordingly, the first logical partition is associated with a first set of the plurality of multi-core processing units that are configured in accordance with the first operating performance mode. It is determined that a second of the plurality of operating performance modes satisfies a second performance criterion that corresponds to a second workload of a second logical partition of the system. Accordingly, the second logical partition is associated with a second set of the plurality of multi-core processing units that are configured in accordance with the second operating performance mode.

14 Claims, 8 Drawing Sheets

(56) References Cited

U.S. PATENT DOCUMENTS

| | | |
|---|---|---|
| 7,076,609 B2 * | 7/2006 | Garg et al. ............... 711/120 |
| 7,093,147 B2 * | 8/2006 | Farkas et al. ............. 713/320 |
| 7,246,205 B2 | 7/2007 | Balakrishnan et al. |
| 7,363,450 B1 | 4/2008 | Fedorova |
| 7,380,068 B2 | 5/2008 | Shafi et al. |
| 7,398,374 B2 | 7/2008 | DeLano |
| 7,512,837 B1 | 3/2009 | Flemming et al. |
| 7,748,005 B2 * | 6/2010 | Romero et al. ........... 718/104 |
| 7,996,839 B2 | 8/2011 | Farkas et al. |
| 2004/0243765 A1 | 12/2004 | Lee et al. |
| 2006/0026447 A1 * | 2/2006 | Naveh et al. ............. 713/322 |
| 2006/0143409 A1 | 6/2006 | Merrell et al. |
| 2009/0006756 A1 | 1/2009 | Donley |
| 2009/0037658 A1 | 2/2009 | Sistla |
| 2009/0070617 A1 | 3/2009 | Arimilli et al. |
| 2011/0161979 A1 | 6/2011 | Flemming et al. |

OTHER PUBLICATIONS

Parekh, Sujay et al., "Thread-Sensitive Scheduling for SMT Processors", ww.cs.washington.edu/research/smt/papers/threadScheduling.pdf (Obtained from the Internet on Apr. 28, 2009) 2000, 18 pages.

Viana, Pablo et al., "Configurable Cache Subsetting for Fast Cache Tuning", Annual ACM IEEE Design Automation Conference www2.dac.com/data2/43rd/43acceptedpapers. nsf/0c4c09c6ffa905c48725 6b7b007afb72/29ccf8f43d1b7aea8725715d006ca024/$File/39_3. Pdf (Obtained from the internet on Apr. 28, 2009) Jul. 24-28, 2006, 695-700.

"U.S. Appl. No. 12/650,909 Office Action", Sep. 12, 2012, 16 pages.

"U.S. Appl. No. 12/650,909 Office Action", Oct. 2, 2012, 17 pages.

* cited by examiner

MIXED OPERATING PERFORMANCE MODES INCLUDING A SHARED CACHE MODE

RELATED APPLICATIONS

This application claims the benefit under 35 U.S.C. §120 of U.S. application Ser. No. 12/650,909 filed Dec. 31, 2009.

BACKGROUND

Embodiments of the inventive subject matter generally relate to the field of virtualization, and, more particularly, to a mixed operating performance mode logical partition (LPAR) configuration.

Multi-core processing units on a system can be configured to optimize processing of workloads handled by the system. For instance, the multi-core processing units can be configured in one of multiple operating performance modes for particular types of processing (e.g., database workloads). Configuring the multi-core processing units for workload optimization can include adapting algorithms, and adapting paths between various components of the system (e.g., cache and main memory). Typically, the operating performance mode is selected during the boot process.

SUMMARY

Embodiments include a method comprising determining that a plurality of multi-core processing units of a system are configured in accordance with a plurality of operating performance modes. It is determined that a first operating performance mode of the plurality of operating performance modes satisfies a first performance criterion that corresponds to a first workload of a first logical partition of the system. The first logical partition is associated with a first set of the plurality of multi-core processing units that are configured in accordance with the first of the plurality of operating performance modes, in response to determining that the first operating performance mode satisfies the first performance criterion that corresponds to the first workload. It is determined that a second operating performance mode of the plurality of operating performance modes satisfies a second performance criterion that corresponds to a second workload of a second logical partition of the system. The second logical partition is associated with a second set of the plurality of multi-core processing units that are configured in accordance with the second of the plurality of operating performance modes, in response to determining that the second operating performance mode satisfies the second performance criterion that corresponds to the second workload.

Another embodiment includes a method comprising detecting a workload condition at a system for altering a configuration of a logical partition on the system. It is determined that the workload condition corresponds to a first operating performance mode. The logical partition is currently associated with first physical resources configured to operate in a second operating performance mode. Second physical resources of the system configured to operate in the first operating performance mode are determined. The logical partition is disassociated from the first physical resources. The logical partition is associated with the second physical resources.

BRIEF DESCRIPTION OF THE DRAWINGS

The present embodiments may be better understood, and numerous objects, features, and advantages made apparent to those skilled in the art by referencing the accompanying drawings.

DESCRIPTION OF EMBODIMENT(S)

Figure 1:
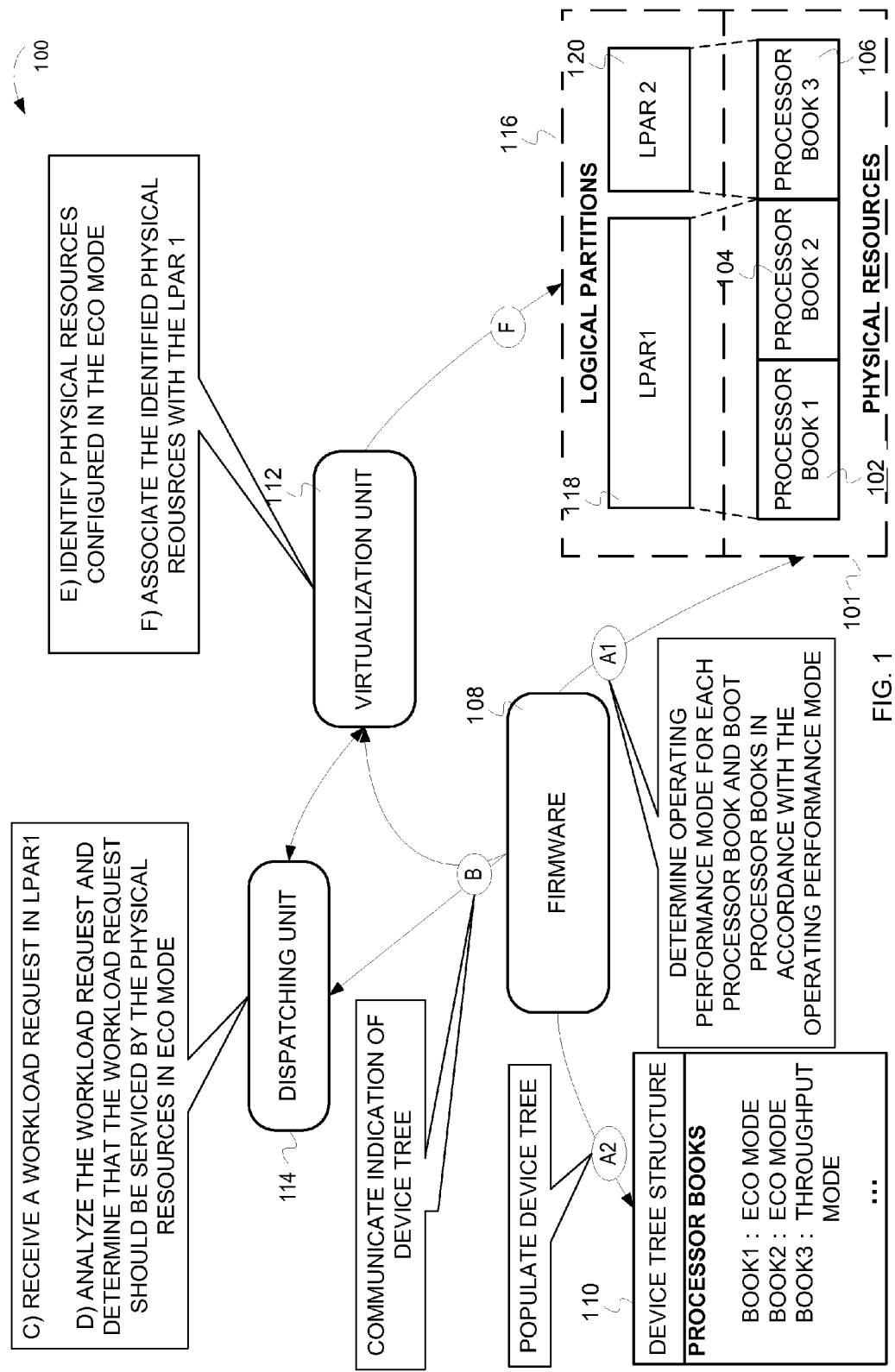
FIG. 1 is an example conceptual diagram illustrating coexistence of extended cache option (ECO) and throughput operating performance modes.

The description that follows includes exemplary systems, methods, techniques, instruction sequences, and computer program products that embody techniques of the present inventive subject matter. However, it is understood that the described embodiments may be practiced without these specific details. For instance, although examples refer to determining an operating performance mode of processor books, the embodiments are not limited to processor books. In other implementations, a combination of processors, multi-chip modules, or other multi-core processing units, wherein each core comprises on-chip cache(s) and off-chip cache(s), may be configured in the requisite operating performance modes. In addition, examples often refer to analysis of workload requests, but embodiments are not so limited. Embodiments can determine an appropriate operating performance mode based on any one of analysis of the workload itself, metadata of an application(s) that will handle the workload, etc. In other instances, well-known instruction instances, protocols, structures, and techniques have not been shown in detail in order not to obfuscate the description.

Multi-core processing units (e.g., processor books) on systems can be configured to operate in one of many operating performance modes that focus on either core/thread performance or on throughput. For example, IBM's Power 7® processors are configured to implement a shared-cache operating performance mode for improved core performance. However, not all applications can benefit from or require improved core performance. For example, web servers and infrastructure applications may place more emphasis on achieving improved throughput than on improved core performance. Existing processor designs provide mechanisms for either core/thread performance or throughput. With changing business needs and the dynamic nature of computer services (e.g., cloud computing), an entity can benefit from the capability to reconfigure physical and logical resources to satisfy varying workloads.

Functionality can be implemented to enable both core/thread performance oriented workloads and throughput oriented workloads to be processed on a single system. In some embodiments, multi-core processing units within a system can be configured to operate either in a shared cache mode (also known as an extended cache option or ECO mode) to service performance oriented workloads or in a throughput mode to service throughput oriented workloads. Processing units in the ECO mode can share their caches depending on the state (e.g., active, inactive) of the processing units. Processor units in the throughput mode, on the other hand, use a traditional cache hierarchy. During a boot process, an operating performance mode for each of the multi-core processing units can be determined and caching algorithms associated with each of the multi-core processing units can be adapted based on the determined operating performance mode. Logical partitions can be created with physical resources that are configured in compatible operating performance modes (e.g., either in the ECO mode or in the throughput mode). Additionally, workloads can be analyzed and dispatched on appropriately configured physical resources that are associated with an LPAR(s) to which the workloads are assigned, based on the nature of the workloads (e.g., whether performance-oriented or throughput-oriented). Such a coexistence of multi-core processing units in multiple operating performance modes on a single system, allows the single system to operate in an operating performance mode best suited to service the workload. Moreover, the system can be dynamically changed (e.g., by changing the operating performance mode in which a multi-core processing unit is configured to operate) to cater to changing workload requirements.

FIG. 1 is an example conceptual diagram illustrating coexistence of processor books configured in an extended cache option (ECO) and a throughput operating performance modes. FIG. 1 depicts a system 100 comprising physical resources 101, firmware 108, a dispatching unit 114, a virtualization unit 112, and logical partitions 116. The physical resources 101 comprise three processor books 102, 104, and 106. Each of the processor books 102, 104, and 106 comprise multiple cores. Also, each core in the processor books 102, 104, and 106 is associated with on-chip cache(s) (e.g., L2 cache, L1 cache) and off-chip cache(s) (e.g., L3 cache, L4 cache, etc.). The firmware 108 communicates with the dispatching unit 114 and the virtualization unit 112 to ensure that workloads are dispatched to physical resources in an appropriate operating performance mode.

Figure 3:
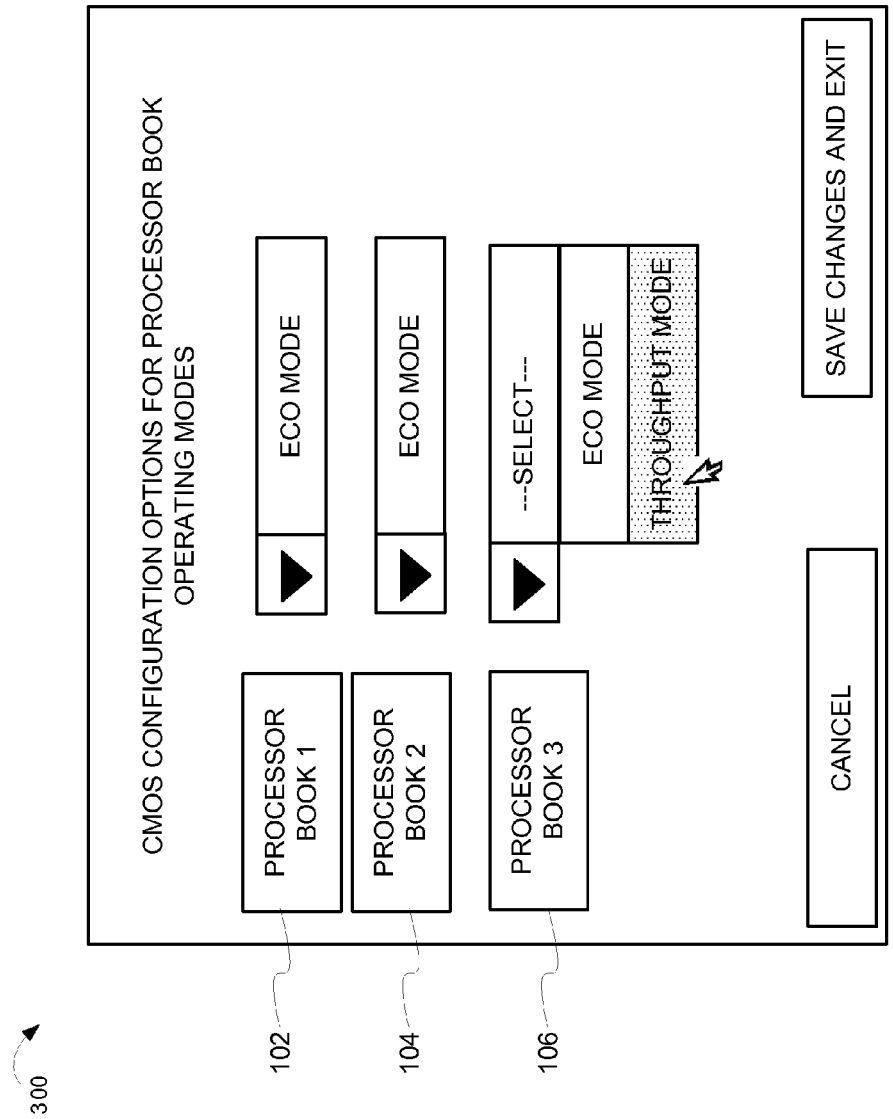
FIG. 3 depicts an example CMOS configuration options for configuring operating performance modes of processor books.

At stage A1, the firmware determines an operating performance mode for each of the processor books 102, 104, and 106 and boots the processor books 102, 104, and 106 in accordance with the operating performance modes. A basic input/output system (BIOS) in the firmware 108 initiates a boot process. The BIOS can access a CMOS configuration setup to determine an operating performance mode for each of the processor books 102, 104, and 106. A system administrator may change the operating performance mode for any of the processor books 102, 104, and 106 by entering the CMOS configuration setup (e.g., by pressing one or more keys). Each of the different operating performance modes may be configured to use a cache hierarchy (e.g., a combination of on-chip and off-chip caches) associated with the cores differently to achieve different performance requirements. As depicted in FIG. 3, the CMOS configuration options 300 allow the system administrator to indicate which processor books 102, 104, and 106 should operate in the ECO mode and which processor books should operate in the throughput mode. As will be described below, the ECO mode is a shared cache mode, where off-chip caches associated with inactive cores are shared among active cores. In the throughput mode, however, cores retain their cache hierarchy and cache sharing is not implemented. In FIG. 3, the processor books 102 and 104 are configured to operate in the ECO mode and the processor book 106 is configured to operate in the throughput mode. It should be noted that although only two operating performance modes of the processor books are depicted and described, embodiments can provide for configuration in accordance with other operating performance modes. Once the operating performance mode of the processor books has been identified, the BIOS continues the boot process. The system 100 identifies physical resources of the system 100, performs tests (e.g., a power-on self-test) to ensure that that the physical resources are operational, loads device drivers, and performs operations for launching the operating system.

At stage A2, the firmware 108 populates a device tree 110. As the system 100 continues booting, a process of the firmware 108 takes an inventory of the physical resources on the system and creates the device tree 110. For example, the firmware process may search for and identify memory devices (e.g., hard disk drives), serial devices, a number of processor books, a number of cores in the processor books, an amount of memory, etc. After the device tree 110 is populated with indications of physical resources on the system 100, the boot process continues. Based on the device tree 110, the boot process configures each of the physical resources (e.g., checks for and runs device drivers associated with each of the physical resources), assigns logical names to the physical resources, assigns ports (if any) that are associated with the physical resources, assigns logical names for the ports, etc. As depicted in FIG. 1, the device tree 110 indicates that the system 100 comprises three processor books. The device tree 110 also indicates that two of the processor books 102, 104 are configured to operate in the ECO mode, and indicates that the third processor book 106 is configured to operate in the throughput mode.

At stage B, the firmware 108 transmits an indication of the device tree 110 to an operating system. The firmware 108 serves the device tree 110 to the operating system to enable software to be cognizant of hardware available on the system 100. This means that the operating system is cognizant of the processor books on the system 100, a number of cores and their associated on-chip and off-chip caches in each of the processor books. The operating system is cognizant of operating performance modes of the processor books. In other words, once the firmware 108 serves the device tree 110 to the operating system, the operating system is aware of whether a processor book is configured to operate in the ECO mode or in the throughput mode. Therefore, other processing modules, including the dispatching unit 114 and the virtualization unit 112, are also cognizant of the operating performance modes of each of the processor books 102, 104, and 106 on the system 100.

At stage C, the dispatching unit 114 receives a workload request in the LPAR 118. The workload request can be received from an application and can comprise a set of instructions to perform user-initiated/system tasks. The workload request may be assigned to the LPAR 118 and physical resources may be associated to the LPAR 118 based on requirements of the workload request as will be described in stages D-F.

At stage D, the dispatching unit 114 analyses the workload request and determines that physical resources operating in the ECO mode should service the workload request. In some implementations, the dispatching unit 114 may be a part of the operating system. In another implementation, the dispatching unit 112 may be embodied as part of the virtualization unit 112. The dispatching unit 114 can analyze the workload request to determine a response time (e.g., a difference between a time instant at which the system receiving the workload request and a time instant at which an output of the workload request is produced) associated with the workload. The dispatching unit 112 can compare the response time associated with the workload request with a threshold time.

The dispatching unit 112 can deem the workload to be a performance oriented workload if the response time is less than the threshold time. The dispatching unit 112 can deem the workload to be a throughput oriented workload if the response time is greater than the threshold time.

In some implementations, the system administrator can indicate whether a particular workload is a response time intensive or a throughput intensive workload and accordingly whether physical resources in the ECO mode or the throughput mode should service the workload. The system administrator may also flag certain applications as being response time intensive or throughput intensive so that workload requests arising from the flagged applications are appropriately serviced. In FIG. 1, the dispatching unit 114 determines performance requirements of the workload (i.e., that the workload has a low response time). Accordingly, the dispatching unit 114 also determines that physical resources configured to operate in the ECO mode should service the workload.

At stage E, the virtualization unit 112 identifies physical resources configured in the ECO mode, in response to the dispatching unit 114 determining that physical resources in the ECO mode should service the workload request. The virtualization unit 112 may identify memory and cores from processor books in either the ECO mode or the throughput mode that can be associated with the LPAR 118 to which the workload is assigned. Because the virtualization unit 112 is cognizant of the operating performance mode of the processor books, the virtualization unit 112 can identify physical resources that are configured in a compatible operating performance mode. In some implementations, the physical resources to be allocated to the LPAR 118 may span a single processor book. In another implementation, the physical resources to be allocated to the LPAR 118 may span multiple processor books configured in a common operating mode (e.g., the ECO mode). As illustrated in FIG. 1, the virtualization unit 112 may determine that physical resources that constitute the processor books 102 and 104 should be associated with the LPAR 118.

At stage F, the virtualization unit 112 associates the identified physical resources with the LPAR 118. For example, the virtualization unit 112 can indicate associations between the LPAR 118 and the identified physical resources in the device tree 110. As another example, the virtualization unit 112 can maintain a LPAR structure (not shown) that indicates the association between the LPAR 118 and the identified physical resources. The virtualization unit 112 can comprise a hardware management console (HMC) that may be used to create or change LPARs, to dynamically assign physical resources to the LPARs, etc. The virtualization unit 112 carves logical partitions (LPARs) such that physical resources associated with each of the LPARs are configured in a common operating performance mode.

Figure 2:
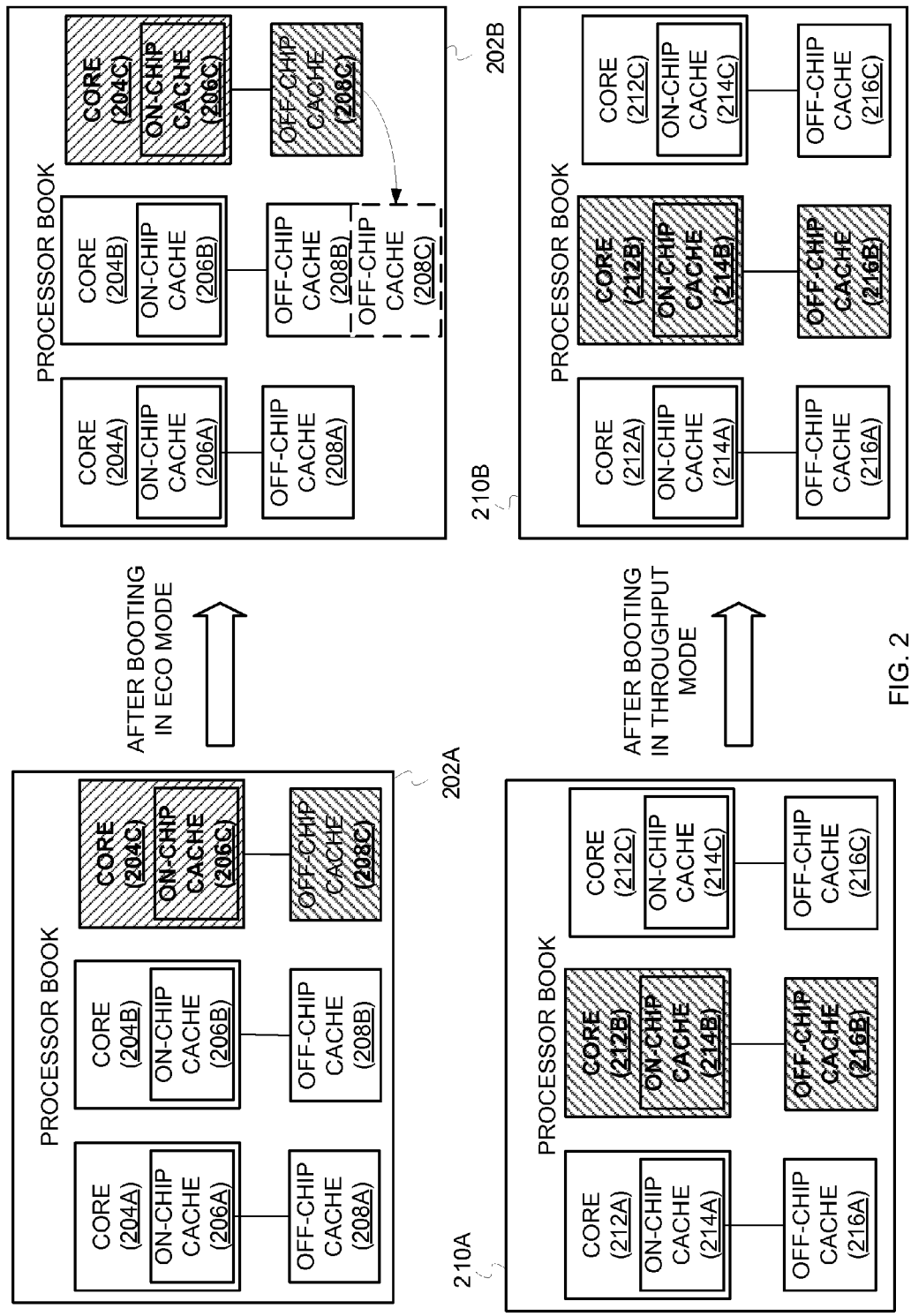
FIG. 2 illustrates processor books configured to operate in the ECO mode and the throughput mode.

FIG. 2 illustrates processor books configured to operate in the ECO mode and the throughput mode. FIG. 2 depicts a processor book 202A comprising three cores 204A, 204B, and 204C. Each core is associated with a dedicated on-chip cache and a dedicated off-chip cache. The cores 204A, 204B, and 204C are respectively associated with their dedicated on-chip cache (e.g., L1 cache, L2 cache) 206A, 206B, and 206C. The cores 204A, 204B, and 204C are also respectively associated with their dedicated off-chip cache (e.g., L3 cache) 208A, 208B, and 208C. Typically, many of the cores within a processor book are inactive. Consequently, the cache hierarchy comprising the on-chip caches and the off-chip caches associated with the inactive cores are also inactive. As depicted in the processor book 202A, the core 204C and its associated cache hierarchy—on-chip cache 206C and off-chip cache 208C are inactive (depicted by hashing across the processing unit 204C, the on-chip cache 206C, and the off-chip cache 208C). The ECO mode allows the inactive off-chip caches to be associated with an active core thus increasing off-chip cache capacity associated with the active core. Processor book 202B illustrates the state of the processor book 202A after the processor book 202A is booted in the ECO mode. As illustrated in the processor book 202B, the off-chip cache 208C of the inactive core 204C is associated with the active core 204B, thus doubling the off-chip cache capacity of the processing unit 204B. The off-chip cache associated with an inactive core may be combined with the off-chip cache associated with an active core that is physically located next to the inactive core. In some implementations, if there are multiple active cores physically located next to the inactive core, the off-chip cache associated with the inactive core may be shared among the multiple active cores. In other implementations, one of the multiple active cores may be selected and the off chip cache of the inactive core may be coupled to the selected active core.

In the throughput mode, however, off-chip caches of inactive cores are not activated and are not associated with active core. Processor book 210A comprises three cores 212A, 212B, and 212C. The core 212A is associated with on-chip cache 214A and off-chip cache 216A. The core 212B is associated with on-chip cache 214B and off-chip cache 216B. The core 212C is associated with on-chip cache 214C and off-chip cache 216C. In the processor book 210A, the core 212B is inactive and therefore its caches 214C and 216C are also inactive. Processor book 210B represents that the state of the processor book 210A is booted in the throughput mode. As depicted in the processor book 210B, the associations of the caches with their respective cores do not change. Each core (whether active or inactive) continues to have a dedicated cache hierarchy. In other words, the off-chip cache 216B of the inactive core 212B is not shared or associated with the active cores 212A and/or 212C.

It should be noted that although FIG. 1 depicts one or more entire processor books being associated with a single LPAR, in some implementations, each processor book can be associated with multiple LPARs. For example, each processor book (e.g., CPU capacity and the memory) may be divided into ten non-overlapping sections, and each of the ten sections may be allocated to an LPAR. Moreover, a core may be dedicated to a single LPAR, or may be shared between multiple LPARs. Also, although FIGS. 1 and 2 describe coupling off-chip caches associated with inactive cores with off-chip caches associated with active cores, in other implementations, on-chip caches associated with the inactive cores may also be coupled with on-chip caches associated with the active cores.

Although FIG. 1 describes configuring an operating performance mode for each of the processor books during booting operations, in some implementations, however, the operating performance modes may be changed by manipulating operating performance mode settings in the operating system and forcing the operating system to reboot based on manipulation of the operating performance mode settings. Rebooting the operating system ensures that the representation of physical resources (e.g., the representation of the cache associated with processing units, etc.) is changed and is indicated to the operating system. In some implementations, a configuration manager may detect the manipulation of the operating performance mode settings, remove indications of old operating performance mode settings, reset the operating system's knowledge of the physical resources (e.g., operating performance modes of the processor books, cache hierarchy of the processing units in the processor books, etc.), and provide current operating performance mode settings of the physical resources to the operating system.

It should also be noted that although FIG. 1 describes processor books as configured to operate in the ECO or in the throughput operating performance modes, any suitable multi-core processing units can be configured to operate in the ECO or in the throughput operating performance modes. For example, a combination of processors, multi-chip modules, etc. on a system may be configured to operate either in the ECO mode or in the throughput mode as described with reference to FIG. 1. Moreover, in some implementations, the multi-core processing units can be configured to operate in various operating performance modes. For example, multi-core processing units can be configured to operate in an operating performance mode with a shared off-chip cache (e.g., ECO mode), an operating performance mode with a dedicated off-chip cache (e.g., throughput mode), an operating performance mode with a shared on-chip cache, an operating performance mode that associates arithmetic logic units (ALUs) of inactive cores with the active cores, an operating performance mode that varies CPU clock speed, etc.

Figure 4:
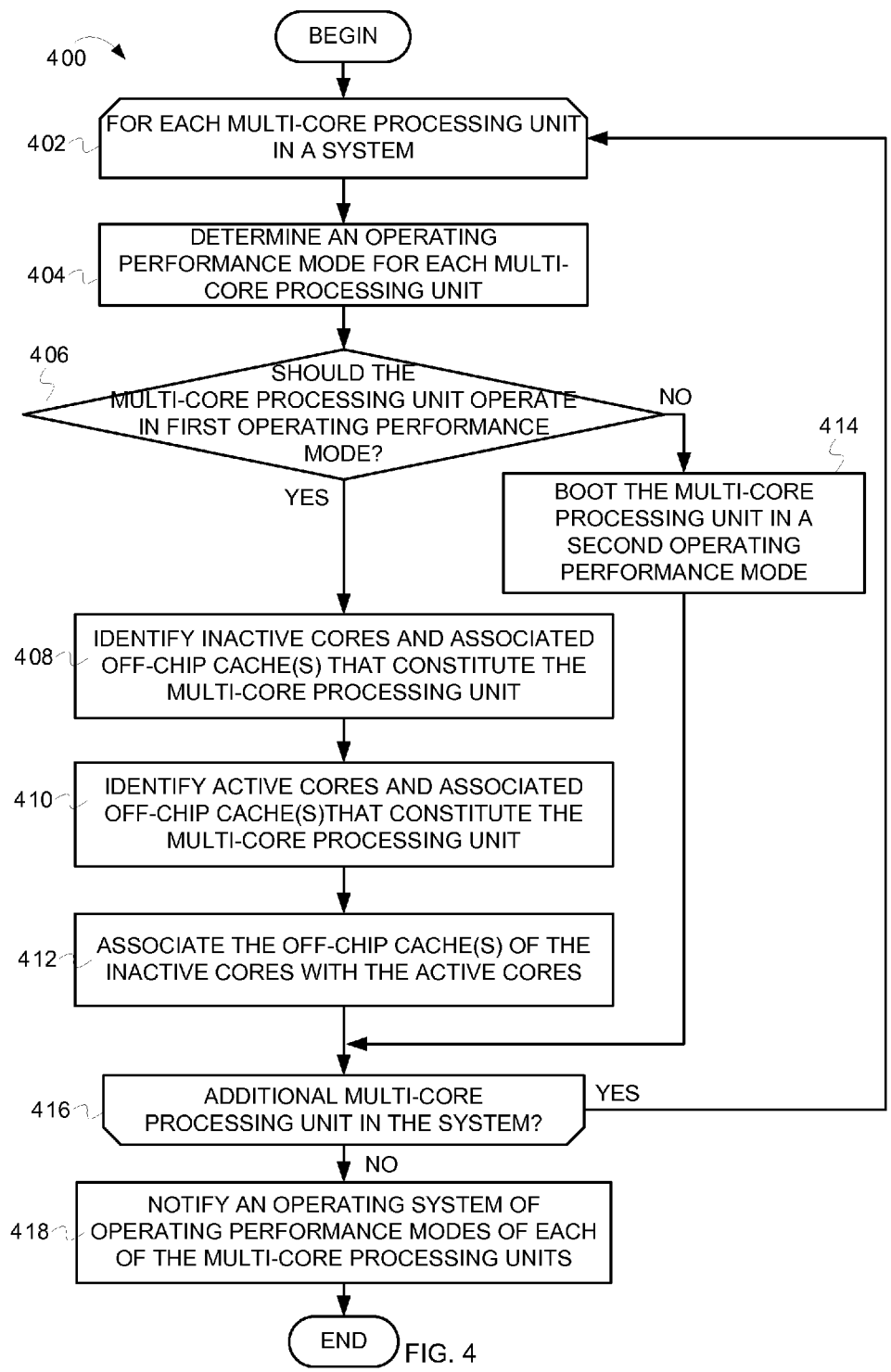
FIG. 4 is a flow diagram illustrating example operations for configuring an operating performance mode for each multi-core processing unit in a system.

FIG. 4 is a flow diagram illustrating example operations for configuring an operating performance mode for each multi-core processing unit in a system. Flow 400 begins at block 402.

A loop begins for each multi-core processing unit in a system (block 402). For example, during a booting process, each multi-core processing unit in the system may be analyzed to perform the set of operations described in blocks 404-416. The flow continues at block 404.

An operating performance mode for the multi-core processing unit in the system is determined (block 404). A system administrator may configure the operating performance mode for the multi-core processing unit by configuring CMOS configurations options associated with the multi-core processing unit. For example, during an initialization stage in the booting process, the system administrator can indicate the operating performance mode for the multi-core processing unit in the CMOS configuration options (as indicated in FIG. 3). The system administrator can configure the operating performance mode for the multi-core processing units, determine which and how many of the multi-core processing units should be configured to operate in one of multiple operating performance modes based on knowledge of workloads that will be serviced by the system, available hardware infrastructure, etc. The flow continues at block 406.

It is determined whether the multi-core processing unit should be configured in a first operating performance mode (block 406). The first operating performance mode may be a shared cache mode, where off-chip caches associated with an inactive core are coupled with off-chip caches associated with an active core thus increasing the off-chip cache capacity of the active core. Sharing the off-chip caches associated with the inactive core with the active core boosts a core to cache ratio which, in turn, boosts performance of the active core. Alternately, in a second operating performance mode, each core in the multi-core processing unit is associated with dedicated on-chip and off-chip caches and off-chip caches associated with an inactive core are not coupled with an active core. The multi-core processing units can be configured to operate in either the first operating performance mode or the second operating performance mode. The system can comprise multiple multi-core processing units each of which operate in different operating performance modes so that workloads with different performance requirements can be serviced by multi-core processing units configured in an appropriate operating performance mode. For example, throughput oriented workloads may be serviced by multi-core processing units configured in the second operating performance mode and core/thread performance oriented workloads can be serviced by multi-core processing units configured in the first operating performance mode. If it is determined that the multi-core processing unit should be configured in the first operating performance mode, the flow continues at block 408. Otherwise, the flow continues at block 414.

The multi-core processing unit is booted to operate in the second operating performance mode (block 414). In the second operating performance mode, each core (whether active or inactive) retains its dedicated on-chip and off-chip cache. In other words, in the second operating performance mode, the off-chip caches associated with the inactive cores are not coupled with the off-chip caches associated with the active cores. The flow continues at block 416.

Inactive cores and their associated off-chip caches that constitute the multi-core processing unit are identified (block 408). The flow 400 moves from block 406 to block 408 on determining that the multi-core processing unit should be configured in the first operating performance mode. The inactive cores can be identified by analyzing a device tree or other device configuration structure. In addition to identifying the inactive cores, on-chip and off-chip caches associated with the inactive cores may also be determined. The flow continues at block 410.

Active cores, and their associated off-caches, that constitute the multi-core processing unit are identified (block 410). The active cores can be determined by analyzing the device tree or other device configuration structure. In some implementations, the active cores that are physically adjacent to the inactive cores may be identified. The flow continues at block 412.

The off-chip caches of the inactive cores are associated with the active cores (block 412). This increased the off-chip cache capacity associated with the active cores. In some implementations, the off-chip cache associated with the inactive core may be shared between two or more active cores. In other implementations, the off-chip cache associated with the inactive core may be coupled with a single active core. The flow continues at block 416.

It is determined whether there exist additional multi-core processing units in the system (block 416). The device tree may be accessed to determine whether there exist additional multi-core processing units in the system. If it is determined that there exist additional multi-core processing units in the system, the flow continues at block 402, where a next multi-core processing unit is identified, an operating performance mode for the multi-core processing unit is determined, and the multi-core processing unit is booted to operate in the determined operating performance mode. If it is determined that there do not exist additional multi-core processing units, the flow continues at block 418.

An operating system is notified of the operating performance mode associated with each of the multi-core processing units in the system (block 418). In some implementations, the device tree may be populated to indicate the operating performance mode of the multi-core processing units, the inactive and the active cores, off-chip caches associated with the cores, etc. Serving information that indicates the operating performance mode associated with each of the multi-core processing units to the operating system can ensure that a virtualization unit can appropriately associate physical resources with LPARs. Appropriately configured physical resources can be associated with the LPARs based on performance requirements of workloads allocated to the LPARs. For example, the virtualization unit may carve the LPARs so that physical resources allocated to a single LPAR are configured to operate in one of the multiple operating performance modes (as described in FIG. 6). Serving information that indicates the operating performance mode associated with each of the multi-core processing units to the operating system can also ensure that a dispatching unit can dispatch workloads to appropriate physical resources depending on performance requirements of a workload (as described in FIG. 5). From block 412, the flow ends.

Figure 5:
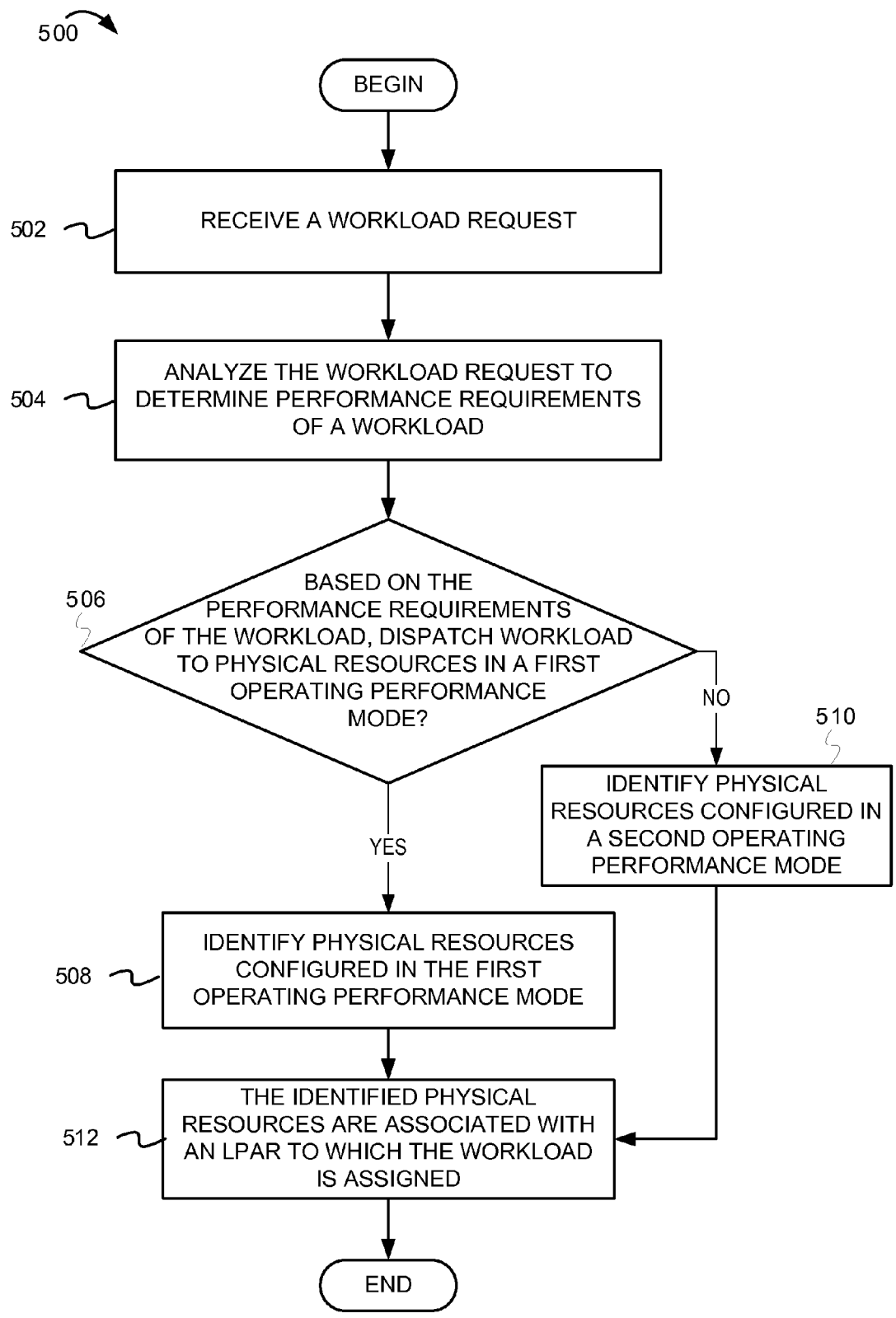
FIG. 5 is a flow diagram illustrating example operations for dispatching workloads based on performance requirements of the workloads.

FIG. 5 is a flow diagram illustrating example operations for dispatching workloads based on performance requirements of the workloads. Flow 500 begins at block 502.

A workload request is received (block 502). The workload request may be received by an operating system. The workload request may be received from an application in response to a user-initiated request or system-initiated request. In some implementations, the workload may be assigned to an LPAR and physical resources configured in either a first or a second operating performance mode may be associated with the LPAR. The flow continues at block 504.

The workload request is analyzed to determine performance requirements of a workload (block 504). The workload request may be analyzed to determine whether the workload requires a low response time or a high throughput. In one implementation, a system administrator may indicate whether the workload is a response time intensive or a throughput intensive workload. For example, the system administrator may set a flag, for each application running on the system, indicating whether the application generates a response time intensive or a throughput intensive workload. The applications that generate the workload requests may be classified to enable an operating system (or other processing unit) to determine how to dispatch the workloads. The flow continues at block 506.

It is determined, based on the performance requirements of the workload, whether the workload should be dispatched to physical resources in a first operating performance mode (block 506). Recognizing when to dispatch the workloads to the physical resources configured to operate in the first operating performance mode can comprise monitoring response time requirements of the workload. For example, it may be determined that the workload should be serviced by physical resources configured in the first operating performance mode, if it is determined that the workload is a response time intensive workload (i.e., if the workload has a low response time). As another example, it may be determined that the workload should be serviced by physical resources configured in a second operating performance mode, if it is determined that the workload is a throughput intensive workload (e.g., if the workload has a high response time, if throughput requirements are greater than a threshold number of bits per second). Based on identifying multi-core processing units that are configured to operate in each of the operating performance modes, cores and memory that constitute the multi-core processing units in each of operating performance modes can be identified. Accordingly, the operating system can choose, from a set of available cores and associated caches, physical resources configured in a requisite operating performance mode and can accordingly dispatch the workload for further processing. If it is determined that the workload should be dispatched to physical resources in the first operating performance mode, the flow continues at block 508. Otherwise, the flow continues at block 510.

Physical resources that are configured in the first operating performance mode are identified (block 508). On determining that physical resources in the first operating performance mode should process the workload, a set of multi-core processing units that are configured to operate in the first operating performance mode may be determined. Additionally, cores and caches in the set of multi-core processing units may also be determined. In one implementation, the operating system or a dispatching unit can, based on accessing a device tree, determine multi-core processing units that are configured to operate in the first operating performance mode and dispatch the workload accordingly. From block 508, the flow continues at block 512.

Physical resources that are configured in the second operating performance mode are identified (block 510). The flow 500 moves from block 506 to block 510 on determining that the workload should not be dispatched to physical resources in the first operating performance mode. On determining that physical resources in the second operating performance mode should process the workload, a set of multi-core processing units that are configured to operate in the second operating performance mode may be determined. In one implementation, the operating system or the dispatching unit can, based on accessing a device tree, determine multi-core processing units that are configured to operate in the second operating performance mode and dispatch the workload accordingly. From block 510, the flow continues at block 512.

The identified physical resources are associated with the LPAR, to which the workload request is assigned (block 512). For example, it may be determined that the workload is a response-time intensive workload and that the workload request should be dispatched to physical resources configured in the first operating performance mode. Accordingly, identified physical resources in the first operating performance mode (determined at bock 508) may be associated with the LPAR. As another example, it may be determined that the workload is a throughput-intensive workload and that the workload request should be dispatched to physical resources configured in the second operating performance mode. Accordingly, identified physical resources in the second operating performance mode (determined at bock 510) may be associated with the LPAR. From block 512, the flow ends.

Figure 6:
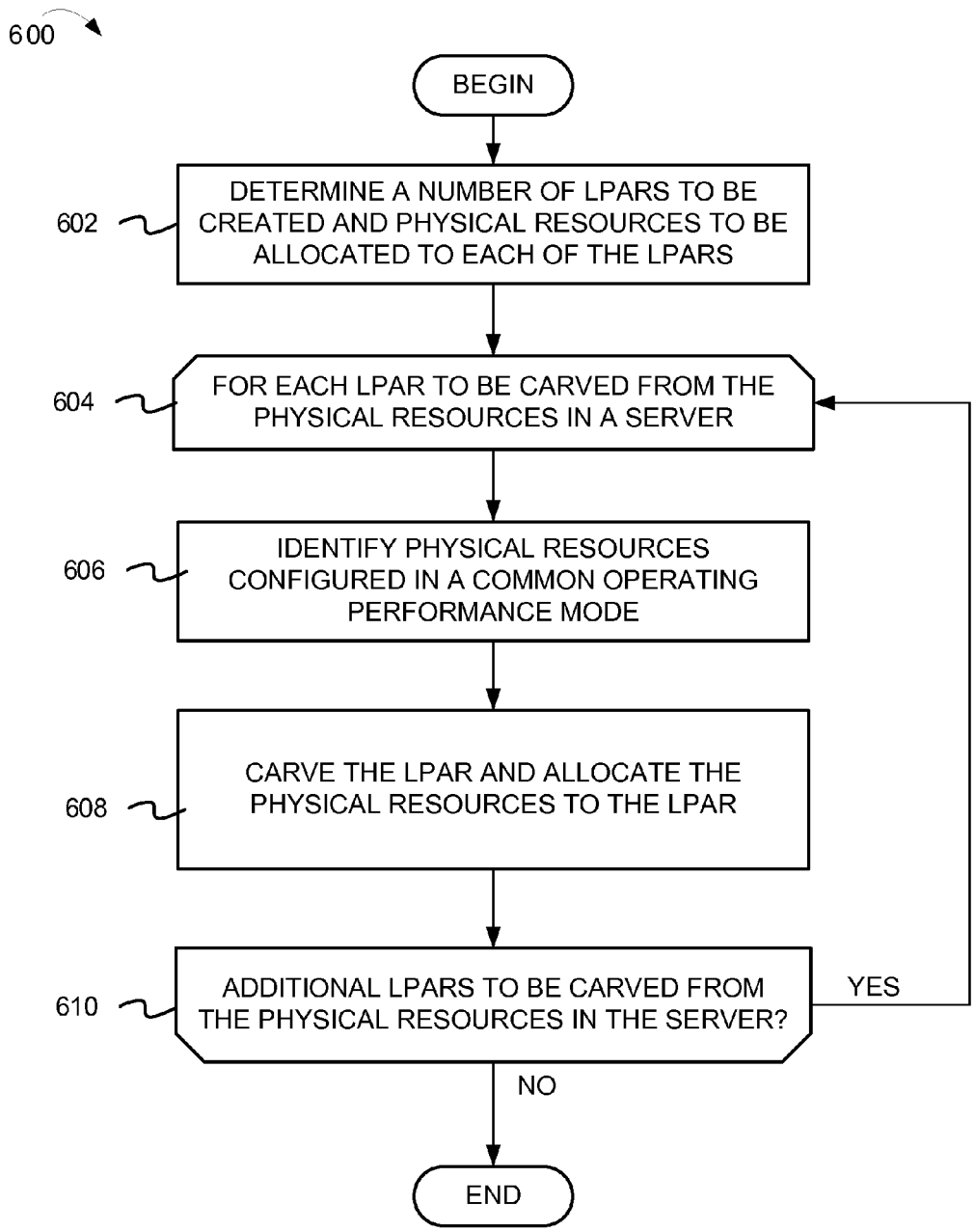
FIG. 6 is a flow diagram illustrating example operations for carving LPARs based on operating performance modes of multi-core processing units in a system.

FIG. 6 is a flow diagram illustrating example operations for carving LPARs based on operating performance modes of multi-core processing units in a system. Flow 600 begins at block 602.

A number of LPARs to be created and physical resources to be allocated to each of the LPARs is determined (block 602). The number of LPARs to be created may be determined based on a type, a number, operating requirements, and performance requirements of applications running on a system. The number of physical resources (e.g., number of cores, amount of memory, etc) and an operating performance mode of the physical resources (e.g., a first or a second operating performance mode) to be associated with an LPAR may be determined based on performance requirements of a workload assigned to the LPAR. For example, the number of LPARs and amount of physical resources to be allocated to each of the LPARs may be determined based on knowledge of whether (and how many) workloads serviced by the system require low response time or high throughput. The flow continues at block 604.

A loop begins for each LPAR to be carved from physical resources that constitute the system (block 604). The flow continues at block 606.

Physical resources that are configured in a common operating performance mode are identified (block 606). Because workloads are typically processed by physical resources that are configured one of multiple operating performance modes (based on the performance requirements of the workloads), the LPAR can be associated with physical resources configured to operate in only one of the multiple operating performance modes. For example, a single LPAR may not be associated with two cores—one that is configured to operate in the first operating performance mode and another that is configured to operate in the second operating performance mode. In other words, multi-core processing units and consequently cores and memory that constitute the multi-core processing units that operate in the common operating performance mode are identified.

The operating performance mode of the physical resources may be determined based on the performance requirements of the workloads. As described earlier, if it is determined (e.g., based on analyzing the workload) that the workload should be dispatched to physical resources in the first operating performance mode, multi-core processing units configured in the first operating performance mode can be identified. A device tree may be accessed to identify multi-core processing units configured in the first operating performance mode. Likewise, if it is determined that the workload should be dispatched to physical resources in the second operating performance mode, multi-core processing units configured in the second operating performance mode can be identified.

For example, based on the performance requirements of a workload, it may be determined that the workload 1024 MB of memory and 2 cores configured in the first operating performance mode. Accordingly, 1024 MB of memory and 2 cores may be identified, from multi-core processing units configured in the first operating performance mode, for allocation to the LPAR. As another example, based on the performance requirements of a workload, it may be determined that the workload requires 9216 MB of memory and 3 cores configured in the second operating performance mode. Accordingly, 9216 MB of memory and 3 cores may be identified, from multi-core processing units configured in the second operating performance mode, for allocation to the LPAR. The flow continues at block 608.

The LPAR is carved and the identified physical resources are allocated to the LPAR (block 608). The physical resources associated with the LPAR are configured in a common operating performance mode, and the operating performance mode is determined based on the performance requirements of the workload (e.g., response time requirements, throughput requirements, etc.). This can ensure coexistence of multi-core processing units that are configured in different operating performance modes on the same system. The LPARs are typically carved (e.g., physical resources are allocated to the LPARs) to conform to the operating performance modes of each of the multi-core processing units. The LPARs may be carved based on knowledge of the operating performance mode of the multi-core processing units, cores, and cache memory. In one implementation, the LPAR may be carved so that the LPAR is allocated physical resources that constitute a single multi-core processing unit. In another implementation, the LPAR may be carved so that the LPAR is allocated physical resources that span multiple multi-core processing units, where the multiple multi-core processing units are configured in the same operating performance mode. The flow continues at block 610.

It is determined whether there exist additional LPARs to be carved from the physical resources that constitute the system (block 610). If so, the flow loops back to block 604 where a next LPAR is identified and performance requirements of a workload assigned to the next LPAR is determined. An operating performance mode and corresponding physical resources are identified and the next LPAR is carved from the physical resources configured in a requisite operating performance mode. If it is determined that there do not exist additional LPARs to be carved from the physical resources that constitute the system, the flow ends.

In some implementations, dynamic logical partitioning (DLPAR), whereby physical resources of the system (e.g., memory, CPU capacity, etc.) can be seamlessly moved between LPARs on the system, may also be supported. To implement DLPAR, however, physical resources may be moved from one LPAR to another only if the two LPARS are configured in a common operating performance mode. In some implementations, the physical resources associated with the LPARs may be changed based on variations in performance requirements of the workload assigned to the LPAR. This is further described with reference to FIG. 7.

Figure 7:
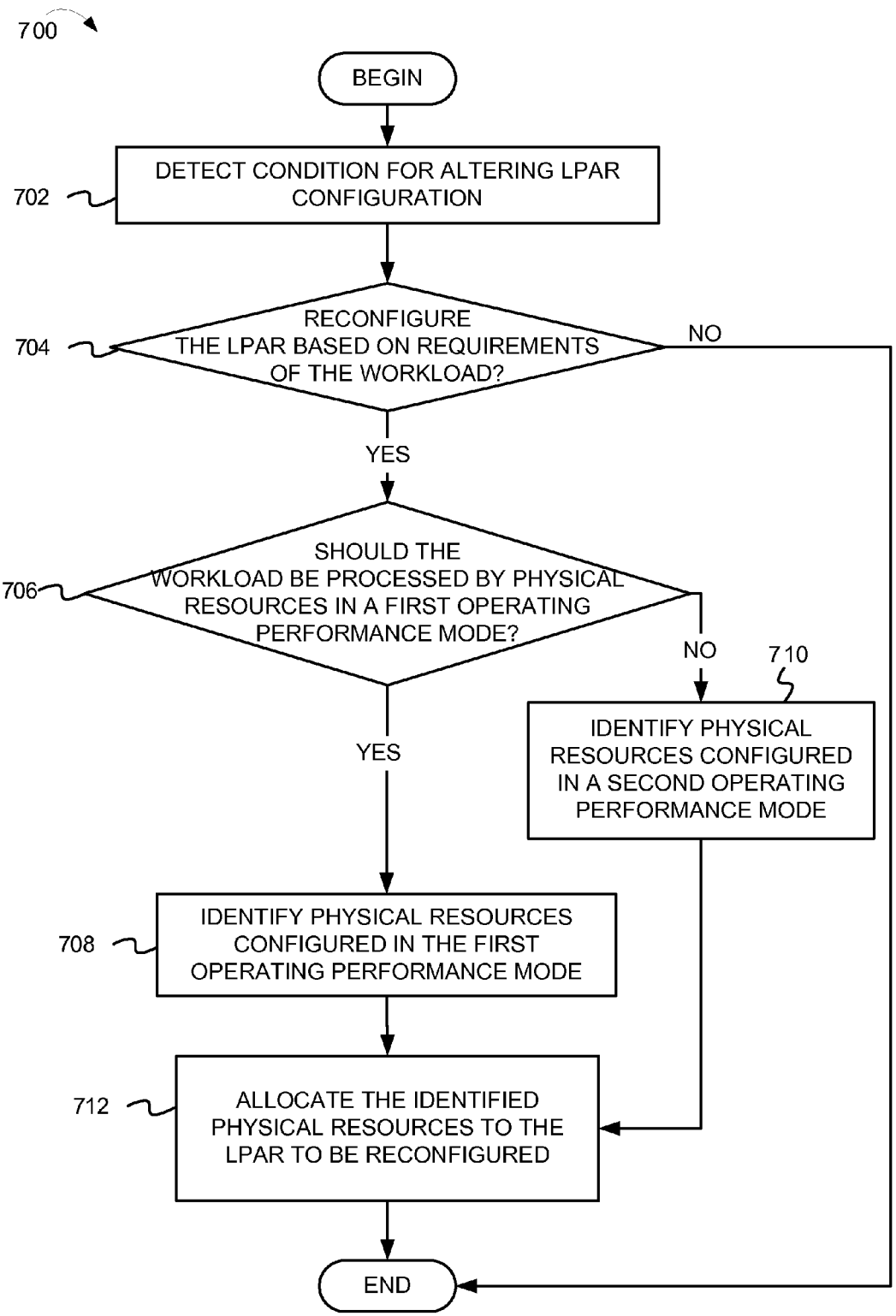
FIG. 7 is a flow diagram illustrating example operations for dynamic logical partitioning based on operating performance modes of multi-core processing units.

FIG. 7 is a flow diagram illustrating example operations for dynamic logical partitioning based on operating performance modes of multi-core processing units. Flow 700 begins at block 702.

A condition for altering a LPAR configuration is detected (block 702). For instance, it may be determined that additional memory or processing capacity is required to process a workload assigned to the LPAR. As another example, it may be determined that performance values (e.g., response time) associated with the workload violate threshold performance values. In some implementations, performance requirements of the workload assigned to the LPAR may vary. For example, a workload that was previously identified as a throughput-oriented workload may be identified as a response time intensive workload. The flow continues at block 704.

It is determined whether the LPAR can be reconfigured based on operating requirements of the workload (block 704). For example, it may be determined whether there exist physical resources (as part of other LPARs) are that currently not in use and can be temporarily (or permanently) be allocated to the current LPAR. If it is determined that the LPAR can be reconfigured based on the operating requirements of the workload, the flow continues at block 706. Otherwise, the flow ends.

It is determined whether the workload should be processed by physical resources configured in a first operating performance mode (block 706). For example, the workload may be analyzed to determine the performance requirements of the workload and the operating performance mode that is best suited to service the workload. For example, if it is determined that the load on an LPAR associated with physical resources configured in the first operating performance mode is high, physical resources configured in the first operating performance mode may be acquired. As another example, a workload may be dispatched to physical resources configured in the first operating performance mode. Later, it may be determined that the performance requirements of the workload have changed and that the workload should be dispatched to physical resources configured in the second operating performance mode. If it is determined that the workload should be processed by physical resources configured in the first operating performance mode, the flow continues at block 708. Otherwise, the flow continues at block 710.

Physical resources configured in the first operating performance mode are identified (block 708). The physical resources that are configured in the first operating performance mode may be identified by accessing a device tree, consulting a virtualization unit, etc. In one implementation, other LPARs comprising physical resources configured in the first operating performance mode may be identified and some/all of the physical resources not being used on the identified LPARs may be marked for migration to the LPAR to be reconfigured. The flow continues at block 712.

Physical resources configured in a second operating performance mode are identified (block 710). The physical resources that are configured in the second operating performance mode may be identified by accessing the device tree. In one implementation, other LPARs comprising physical resources configured in the second operating performance mode may be identified and some/all of the physical resources not being used on the identified LPARs may be marked for migration to the LPAR to be reconfigured. The flow continues at block 712.

The identified physical resources are allocated to the LPAR to be reconfigured (block 712). The LPAR, to which the workload is assigned, may be dynamically reconfigured by adding the identified physical resources (e.g., processors and memory) to the LPAR and removing the identified physical resources from another LPAR (so that the physical resources are no longer associated with the other LPAR). As one example, based on the performance requirements of the workload, the LPAR may be associated with additional physical resources configured in a previous operating performance mode. As another example, based on changes in the performance requirements of the workload, physical resources configured in the first operating performance mode may be disassociated from the LPAR and physical resources configured in the second operating performance mode may be associated with the LPAR. From block 712, the flow ends.

It should be noted that the operations described in the diagrams (FIGS. 1-7) are examples meant to aid in understanding embodiments, and should not be used to limit embodiments or limit scope of the claims. Embodiments may perform additional operations, fewer operations, operations in a different order, operations in parallel, and some operations differently. For example, although FIGS. 1-7 describe operations for carving LPARs from physical resources associated with one or more multi-core processing units on a single physical system (e.g., a system, a computer system, etc.), in other implementations, the physical resources allocated to an LPAR may be acquired from multi-core processing units (configured to operate in the same operating performance mode) across any suitable number of computer systems. For example, it may be determined that an LPAR should be allocated 2096 MB of memory and 2 cores and should be configured in the first operating performance mode. The LPAR may be allocated 1048 MB of memory and 2 cores from physical resources (in the first operating performance mode) on a first computer system and another 1048 MB of memory from physical resources (configured in the first operating performance mode) on a second computer system.

It should also be noted that in some implementations, an LPAR may comprise physical resources configured in different operating performance modes. For example, it may be determined that an LPAR should be allocated 2096 MB of memory and two cores to service a workload. An operating performance mode for the workload assigned to the LPAR may not be indicated or the workload may not be associated with stringent performance/operating requirements. The LPAR may be allocated 1048 MB of memory and 2 cores from physical resources configured in the first operating performance mode and another 1048 MB of memory from physical resources configured in the second operating performance mode. In other implementations, however, either of the first and the second operating performance modes may be selected as the default mode. Workloads that do not indicate a preferred operating performance mode or that are not associated with stringent performance requirements may be dispatched to LPARs associated with physical resources configured in the default operating performance mode.

As will be appreciated by one skilled in the art, aspects of the present inventive subject matter may be embodied as a system, method, or computer program product. Accordingly, aspects of the present inventive subject matter may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present inventive subject matter may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present inventive subject matter may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present inventive subject matter are described with reference to flowchart illustrations and/or block diagrams of methods, apparatus (systems) and computer program products according to embodiments of the inventive subject matter. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 8:
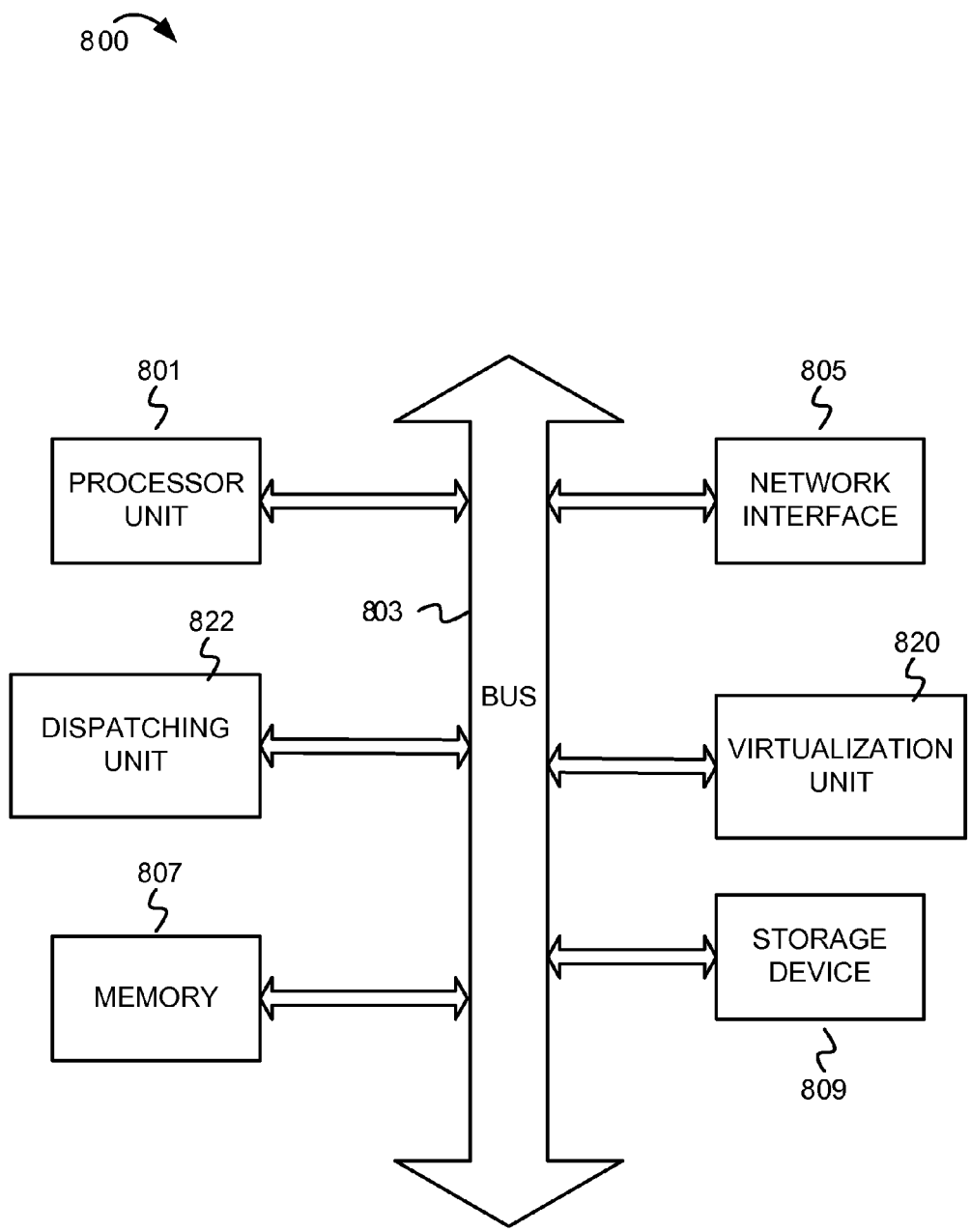
FIG. 8 depicts an example computer system.

FIG. 8 depicts an example computer system 800. The computer system 800 includes a processor unit 801 (possibly including multiple processors, multiple cores, multiple nodes, and/or implementing multi-threading, etc.). The computer system 800 includes memory 807. The memory 807 may be system memory (e.g., one or more of cache, SRAM, DRAM, zero capacitor RAM, Twin Transistor RAM, eDRAM, EDO RAM, DDR RAM, EEPROM, NRAM, RRAM, SONOS, PRAM, etc.) or any one or more of the above already described possible realizations of machine-readable media. The computer system 800 also includes a bus 803 (e.g., PCI bus, ISA bus, PCI-Express bus, HyperTransport® bus, InfiniBand® bus, NuBus bus, etc.), a network interface 805 (e.g., an ATM interface, an Ethernet interface, a Frame Relay interface, SONET interface, wireless interface, etc.), and a storage device(s) 809 (e.g., optical storage, magnetic storage, etc.). Firmware on the computer system 800 can be configured to boot multi-core processing units that constitute the system 800 in a specified operating performance mode. The computer system 800 also comprises a virtualization unit 820 and a dispatching unit 822. On receiving a workload request, the dispatching unit 822 can analyze the workload request and identify an operating performance mode that is best suited to service the workload request. Based on knowledge of an operating performance mode in which each of the multi-core processing units operate and performance requirements of workloads assigned to LPARs, the virtualization unit 820 can carve LPARs so that each LPAR is allocated physical resources that are configured in a common operating performance mode. The workload is dispatched to physical resources that are allocated to the LPAR based on performance requirements of the workload. Any one of these functionalities may be partially (or entirely) implemented in hardware and/or on the processing unit 801. For example, the functionality may be implemented with an application specific integrated circuit, in logic implemented in the processing unit 801, in a co-processor on a peripheral device or card, etc. Further, realizations may include fewer or additional components not illustrated in FIG. 8 (e.g., video cards, audio cards, additional network interfaces, peripheral devices, etc.). The processor unit 801, the storage device(s) 809, and the network interface 805 are coupled to the bus 803. Although illustrated as being coupled to the bus 803, the memory 807 may be coupled to the processor unit 801.

While the embodiments are described with reference to various implementations and exploitations, it will be understood that these embodiments are illustrative and that the scope of the inventive subject matter is not limited to them. In general, techniques for mixed operating performance mode logical partition (LPAR) configuration as described herein may be implemented with facilities consistent with any hardware system or hardware systems. Many variations, modifications, additions, and improvements are possible.

Plural instances may be provided for components, operations, or structures described herein as a single instance. Finally, boundaries between various components, operations, and data stores are somewhat arbitrary, and particular operations are illustrated in the context of specific illustrative configurations. Other allocations of functionality are envisioned and may fall within the scope of the inventive subject matter. In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the inventive subject matter.

What is claimed is:

1. A method comprising:
    identifying, in a first multi-core processing unit of a first set of a plurality of multi-core processing units of a system, an inactive core and an off-chip cache associated with the inactive core;
    identifying, in the first multi-core processing unit of the first set of the plurality of multi-core processing units, an active core and an off-chip cache associated with the active core;
    logically coupling the off-chip cache associated with the inactive core with the active core;
    determining in which of a plurality of operating performance modes each of the plurality of multi-core processing units is configured; and
    for each logical partition configured on the system,
        determining which of the plurality of operating performance modes satisfies a performance criterion that corresponds to a workload of the logical partition;
        associating the logical partition with those of the plurality of multi-core processing units that are configured in the operating performance mode of the plurality of operating performance modes that satisfies the performance criterion that corresponds to the workload.

2. The method of claim 1, further comprising:
    configuring a second set of the plurality of multi-core processing units to operate in a second operating performance mode, wherein a first operating performance mode corresponds to the logical coupling of the off-chip cache associated with the inactive core with the active core.

3. The method of claim 1, further comprising creating at least one logical partition.

4. The method of claim 1 further comprises analyzing at least one of the workload and a request for the workload of each logical partition configured on the system.

5. The method of claim 4, wherein said analyzing at least one of the workload and a request for the-workload of each logical partition configured on the system comprises at least one of determining a response time associated with the workload and determining an operating performance mode indicated for an application that corresponds to the workload.

6. A method comprising:
    detecting a workload condition at a system for altering a configuration of a logical partition on the system;
    determining that the workload condition corresponds to a first operating performance mode, wherein the logical partition is currently associated with first physical resources configured to operate in a second operating performance mode, wherein the operating performance modes comprise a throughput operating mode and a shared cache operating mode, wherein a physical resource configured in the throughput operating mode has a different cache configuration than a physical resource configured in the shared cache operating mode;
    determining second physical resources of the system configured to operate in the first operating performance mode;
    disassociating the logical partition from the first physical resources;
    associating the logical partition with the second physical resources;
    identifying, in the second physical resources of the system, an inactive core and an off-chip cache associated with the inactive core;
    identifying, in the second physical resources of the system, an active core and an off-chip cache associated with the active core; and
    logically coupling the off-chip cache associated with the inactive core with the active core.

7. The method of claim 6, wherein the first and the second physical resources comprise multi-core processing units.

8. The method of claim 6, further comprising dispatching a task that corresponds to the workload condition to the logical partition after the logical partition is associated with the second physical resources.

9. The method of claim 6, further comprising:
    indicating the first operating performance mode for the second physical resources; and
    configuring the second physical resources to operate in the first operating performance mode in response to said indicating the first operating performance mode for the second physical resources, wherein said configuring the second physical resources to operate in the first operating performance mode comprises said logically coupling the off-chip cache associated with the inactive core with the active core.

10. The method of claim 9, wherein said configuring the second physical resources to operate in the first operating performance mode further comprises rebooting the system.

11. The method of claim 6 wherein said detecting a workload condition at a system for altering a configuration of a logical partition on the system comprises determining whether the workload condition corresponds to a throughput oriented workload or a performance oriented workload.

12. The method of claim 1 wherein the operating performance mode comprises one of a throughput operating mode and a shared cache operating mode,
    wherein said determining which of the plurality of operating performance modes satisfies the performance criterion that corresponds to the workload of the logical partition comprises determining whether the workload is a throughput oriented workload or a performance oriented workload.

13. The method of claim 1, further comprising populating a structure to indicate, for each of the plurality of multi-core processing units, one of the plurality of operating performance modes based on determining in which of the plurality of operating performance modes each of the plurality of multi-core processing units is configured.

14. The method of claim 6, further comprising populating a structure to indicate the first operating performance mode based on determining the second physical resources of the system configured to operate in the first operating performance mode.

* * * * *